(12) United States Patent
Matsushita et al.

(10) Patent No.: US 8,111,290 B2
(45) Date of Patent: Feb. 7, 2012

(54) RADIOMETRIC CALIBRATION USING TEMPORAL IRRADIANCE MIXTURES

(75) Inventors: Yasuyuki Matsushita, Beijing (CN); Bennett S. Wilburn, Beijing (CN)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 12/134,211

(22) Filed: Jun. 6, 2008

(65) Prior Publication Data

US 2009/0303330 A1    Dec. 10, 2009

(51) Int. Cl.
  *H04N 17/00* (2006.01)
  *G06K 9/00* (2006.01)
  *G09G 5/02* (2006.01)
  *G06G 3/30* (2006.01)

(52) U.S. Cl. ........ 348/187; 382/100; 382/162; 382/167; 345/589; 345/77

(58) Field of Classification Search .................. 348/187; 382/100, 162, 167; 345/77, 589
See application file for complete search history.

(56) References Cited

U.S. PATENT DOCUMENTS

| | | | |
|---|---|---|---|
| 4,910,694 A | 3/1990 | Walther | |
| 5,828,793 A | 10/1998 | Mann | |
| 6,741,759 B2 | 5/2004 | Lee et al. | |
| 7,084,905 B1 | 8/2006 | Nayar et al. | |
| 7,161,558 B1 | 1/2007 | Eidem et al. | |
| 7,602,938 B2 * | 10/2009 | Prokoski | 382/100 |
| 7,663,640 B2 * | 2/2010 | Nayar et al. | 345/589 |
| 2003/0025067 A1 * | 2/2003 | Tsai et al. | 250/208.2 |
| 2005/0134599 A1 | 6/2005 | Nayar et al. | |
| 2006/0008141 A1 | 1/2006 | Lin et al. | |
| 2006/0257042 A1 | 11/2006 | Ofek et al. | |
| 2006/0262973 A1 | 11/2006 | Lin et al. | |
| 2008/0144060 A1 * | 6/2008 | Ishikawa | 358/1.9 |

OTHER PUBLICATIONS

Dong et al., "High Dynamic Range Imaging for Display on Low Dynamic Range Devices", Date: Mar. 2006, 8 Pages http://scien.stanford.edu/class/psych221/projects/06/hdr_render/.
Campos, "Radiometric Calibration of Charge-Coupled-Device Video Cameras" Abstract of, Date: Nov. 1, 2000, 1 Page, vol. 37, No. 5, Publisher: Bureau International des Poids et Mesures http://www.ingentaconnect.com/content/bipm/met/2000/00000037/00000005/art00025.
Kim, et al., "Joint Feature Tracking and Radiometric Calibration from Auto-Exposure Video", Date Oct. 14-21, 2007, 8 Pages.
Wexler, et al., "Bayesian Estimation of Layers from Multiple Images", Proceedings of the 7th European Conference on Computer Vision-Part III, Date: 2002. Publisher: Springer-Verlag London, UK. pp. 487-501.
Chang, "Rgb Calibration for Color Image Analysis in Machine Vision", Date: Oct. 1996, vol. 5, No. 10. 9 Pages.

(Continued)

*Primary Examiner* — David Ometz
*Assistant Examiner* — Quang Le
(74) *Attorney, Agent, or Firm* — Joseph R. Kelly; Westman, Champlin & Kelly, P.A.

(57) ABSTRACT

A method of calibrating a brightness value measured by a camera with an amount of light received by the camera includes creating a series of measurements, wherein for each measurement the amount of light received at an image plane in the camera is controlled to be a known ratio of two opposed irradiance values: a high irradiance value and a low irradiance value. Each ratio is correlated with the brightness value measured by the camera. A function is obtained describing the correlation.

11 Claims, 6 Drawing Sheets

OTHER PUBLICATIONS

Debevec, et al., "Recovering High Dynamic Range Radiance Maps from Photographs", Proceedings of the 24th annual conference on Computer graphics and interactive techniques, Date: 1997, Publisher: ACM Press/Addison-Wesley Publishing Co. New York, NY, USA. pp. 369-378.

Grossberg, et al., "Determining the Camera Response from Images: What is Knowable", Date: Nov. 2003, vol. 25, No. 11. pp. 1455-1467.

Grossberg, et al., "What is the Space of Camera Response Functions?", Proceedings of the 2003 IEEE Computer Society Conference on Computer Vision and Pattern Recognition, Date: Jun. 18-20, 2003, vol. 2. pp. 602-609.

Kim, et al., "Radiometric Alignment of Image Sequences", Proceedings of the 2004 IEEE Computer Society Conference on, Date Jun. 27-Jul. 2, 2004. vol. 1, 8 Pages.

Lin, et al., "Radiometric Calibration from a Single Image", Proceedings of the 2004 IEEE Computer Society Conference on, Date: Jun. 27-Jul. 2, 2004, vol. 2. pp. 938-945.

Lin, et al., "Determining the Radiometric Response Function from a Single Grayscale Image", Date: Jun. 20-25, 2005, vol. 2. pp. 66-73.

Mann, et al., "On Being 'Undigital' with Digital Cameras: Extending Dynamic Range by Combining Differently Exposed Pictures", 1998. 7 Pages.

Matsushita, et al., "Radiometric Calibration from Noise Distributions", Date Jun. 17-22, 2007, pp. 1-8.

Mitsunaga, et al., "Radiometric Self-Calibration", Date 1999, vol. 1, 7 Pages.

Tsin, et al., "Statistical Calibration of CCD Imaging Process", Proceedings. Eighth IEEE International Conference on, Date: 2001, pp. 480-487, vol. 1.

\* cited by examiner

RADIOMETRIC CALIBRATION USING TEMPORAL IRRADIANCE MIXTURES

BACKGROUND

A digitized photograph can be obtained by taking a photo with a digital camera or by digitizing a photograph taken with a film camera. Such a digitized photograph represents a two-dimensional array of brightness or pixel intensity values. These values may be measured by the camera in many cases. However, these pixel intensity values are rarely true measurements of relative radiance in the photographed scene. For example, if a first pixel has twice the measured pixel intensity of a second pixel, that does not usually mean that the first pixel observed twice the radiance of the second pixel. Instead, there is usually an unknown, nonlinear relationship called a radiometric camera response function that maps how radiance in the scene is related to pixel intensity values in the image.

The functional relationship between the camera's returned value and the actual amount of light entering the camera is unknown for any given camera. Radiometric calibration involves correlating the returned camera value to the amount of light entering the camera. This knowledge is important for applications including, for example, computer vision systems, image processing systems and theories and applications for noise reduction, object tracking, photometric stereo, shape from shading, high dynamic range imaging and estimation of reflectance and illumination from shape and brightness.

Many computer vision algorithms assume that image pixel intensities are linearly related to scene irradiance. For most cameras, however, this is not the case. Camera manufacturers often deliberately engineer nonlinear response functions into their cameras in order to match film characteristics or to account for nonlinear characteristics of computer displays and the human visual system. Even if the response is intended to be linear, the analog circuitry in the image sensors themselves introduce small nonlinearities. Thus, the camera's "radiometric response function," which maps scene irradiance to measured pixel intensities, is generally a nonlinear function.

Calibration methods rely on some known relationship between irradiance at the camera image plane and measured pixel intensities. Prior approaches use a color checker chart with known reflectances, registered images with different exposure ratios, and the irradiance distribution along edges in images, for example.

Radiometric calibration methods generally require means to collect samples of the radiometric response function with some known relationship. For example, one approach is to use an image of a uniformly illuminated Macbeth color chart, which has color patches with known reflectances. A second approach calibrates using multiple registered images of a static scene with different known exposure times. The ratio of the irradiance at the same pixel in different images is equal to the ratio of the exposure times of the images. This relationship is used to solve for a parametric response function. A third method also uses multiple images with different exposures, but solves for a smooth non-parametric function. A fourth method requires only rough estimates of the exposure times and iteratively computes a polynomial inverse response function and more accurate estimates of the exposure times. A fifth method uses a statistical model of the charge-coupled device (CCD) image formation process to iteratively estimate non-parametric inverse response functions.

Several methods have been developed that use multiple exposures but do not require precise registration. A sixth method uses the relationship between the intensity histograms of two scenes imaged with different exposures because intensity histograms are relatively unaffected by small changes in the scene. A seventh method computes point correspondences between images. An eighth method estimates response functions from a rotating and zooming camera.

A ninth method computes the radiometric response function from red, green and blue (RGB) distributions along color edges in a single image. They use a prior model of response functions to compute the radiometric response function as the one which maps nonlinear measured RGB intensity distributions to linear ones. The researchers adapt this idea to grayscale images by measuring the nonuniformity of edge intensity histograms, using spatial mixtures. Recently, other researchers have proposed a tenth method to compute camera response functions from noise distributions. Analyzing noise distributions requires much input data, although a single image can be used under very carefully controlled conditions.

The discussion above is merely provided for general background information and is not intended for use as an aid in determining the scope of the claimed subject matter.

SUMMARY

In one aspect, a method of calibrating a brightness value measured by a camera with an amount of light received by the camera includes creating a series of measurements, wherein for each measurement the amount of light received at an image plane in the camera is controlled to be a known ratio of two opposed irradiance values: a high irradiance value and a low irradiance value. Each ratio is correlated with the brightness value measured by the camera. A function is obtained describing the correlation.

This Summary is provided to introduce a selection of concepts in a simplified form that are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

BRIEF DESCRIPTION OF THE DRAWINGS

FIG. 5(a) is a photograph of an example of motion blur with constant velocity. FIG. 5(b) is a graph showing the pixel intensity for one row of pixels crossing the blurred target. FIG. 5(c) is a photograph of an example of a user interface for specifying the motion blurred region.

DETAILED DESCRIPTION

This disclosure describes embodiments of a novel method for estimating a camera response function in order to linearize the image intensities, thereby allowing for results such as improved performance of vision algorithms.

An exemplary embodiment of a disclosed method for sampling camera response functions involves temporally mixing two uncalibrated irradiances within a single camera exposure. During a single camera exposure to produce a single photograph (or image or shot), the shutter is open for a short duration of time. During that time, each pixel is considered to "see" two different colors, such as black and white for a gray-scale image. For example, a dark gray pixel may be black for ¾ of the time and white for ¼ of the time. A light gray pixel may be black for ¼ of the time and white for ¾ of the time. The term "temporal mixing" is directed to mixing of irradiances with respect to time. Irradiance refers to the radiation to which the subject camera is sensitive. For most cameras, this will refer to the visible light spectrum. However, other cameras are sensitive to radiation in the infrared and other wavelength ranges. Another exemplary embodiment involves temporal mixing over a series of exposures or shots.

Figure 1:
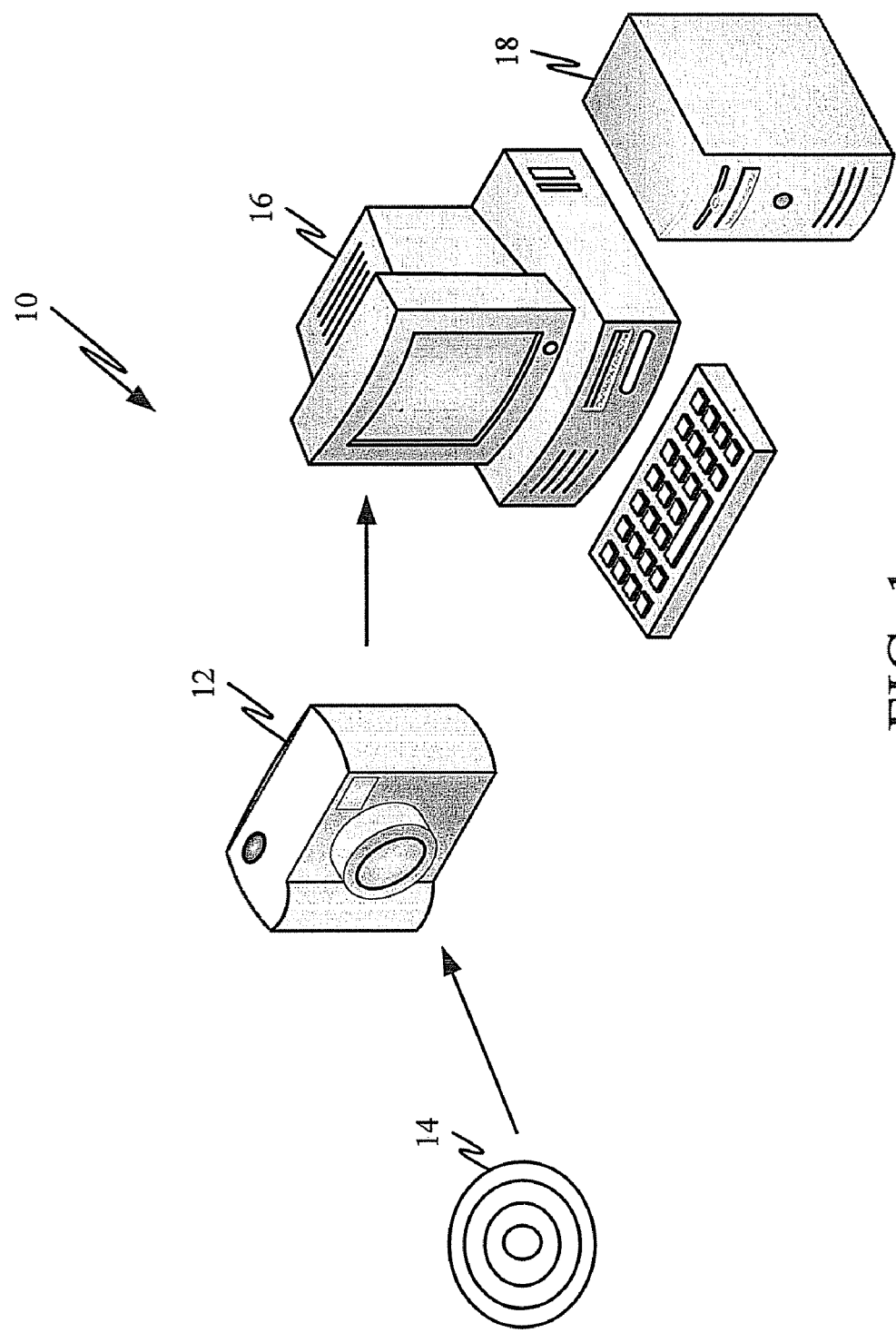
FIG. 1 is an illustration of a system for use with an exemplary disclosed method.

Temporally mixing irradiances allows for dense sampling of the camera response function with known relative irradiances. A first exemplary method, referred to herein as a "display-based" method, computes the camera response curve using temporal mixtures of two pixel intensities on an uncalibrated computer display. FIG. 1 shows an exemplary system 10 having a camera 12, a target 14, a computer display 16, and a computer processor 18. A second exemplary method, referred to herein as a "motion-blur" method, makes use of temporal irradiance mixtures caused by motion blur. Both methods require only one input image, although more images can be used for improved robustness to noise or to cover more of the response curve. Exemplary embodiments of the disclosed methods may be used to compute accurate response functions for a variety of cameras.

The response function f is represented as $$M=f(I),\qquad\text{Eq. 1}$$

where I represents the irradiance at a sensor and M is the measured pixel intensity. Conventionally the axes are normalized to measurement and irradiance ranges in [0,1]. This function is assumed to be constant throughout the image. Imaging and computer vision algorithms are concerned with irradiance, so an exemplary embodiment of a disclosed method solves for the inverse radiometric response function, $g=f^{-1}(M)$.

Cameras accumulate incoming light for the duration of their exposure, which lasts for a period of time. For the duration of the exposure, scene brightness at any given pixel may vary due to motion blur or illumination changes. The first exemplary embodiment of a disclosed method involves constraining the incident brightness to be one of only two values (e.g., black or white). The second exemplary method uses motion blur across the boundary between two regions. Although the accumulated irradiance at each pixel is unknown, if the motion is linear, the brightness in the blurred region will vary linearly along the direction of motion. For a camera with a non-linear response, however, the measured pixel intensities will not vary linearly.

A third exemplary embodiment of a disclosed method uses an illumination change, like a rapidly blinking light, to create brightness mixtures. In this case, the irradiance at each pixel is a linear blend of the irradiances with the light on and off. Linearly increasing the portion of the exposure that the light is on creates a linearly increasing series of accumulated irradiances. Again, this linearity does not correspond with the camera's measured pixel intensities if the camera response function is nonlinear. Exemplary embodiments of the disclosed method exploit these nonlinear intensity measurements to estimate the camera response functions.

Exemplary embodiments of the disclosed method differ from prior work in part in that the exemplary embodiments use temporal color or black and white mixtures to directly sample the response function. Exemplary embodiments of the disclosed method may be practiced with only a single image, do not rely on statistical priors over the response function, and work with color or grayscale images. Calibration from temporal color mixtures does not rely on indirect, statistical methods and priors over camera response functions.

The relationship between image irradiance I and scene radiance L is described as $$E(t) = L(t)\frac{\pi}{4}\left(\frac{d}{h}\right)^2 \cos^4(\phi) \qquad\text{Eq. 2}$$

where h is the lens focal length, d is the aperture diameter, and $\phi$ is the angle subtended by the principal ray from the imaging axis. Equation (2) is simplified to E=kL(t), where $$k = \frac{\pi}{4}\left(\frac{d}{h}\right)^2 \cos^4(\phi).$$

We assume, for now, that k is constant. Image sensors and film are integrating devices, so the total integrated irradiance for an exposure that lasts from time $t_0$ to time $t_1$ is $$I=\int_{t_0}^{t_1}kL(t)dt \qquad\text{Eq. 3}$$

Prior methods assume that L(t) is constant. Exemplary embodiments of the disclosed method instead constrain L(t) to be one of only two values, $L_0$ or $L_1$. Then the integrated irradiance at the sensor becomes $$I=\alpha I_0+(1-\alpha)I_1 \qquad\text{Eq. 4}$$

where $0\leq\alpha\leq 1$ is the portion of time that the scene radiance is $L_0$. $I_0$ and $I_1$ are the accumulated irradiances corresponding to a constant scene radiance of $L_0$ or $L_1$, respectively, for the entire exposure, i.e., $I_0=\int_{t_0}^{t_1}kL_0(t)dt$ and $I_1=\int_{t_0}^{t_1}kL_1(t)dt$. Any convex combination of $I_0$ and $I_1$ may be generated by varying $\alpha$. These temporal blends may be used to sample a camera's response function at known intervals in irradiance between the two irradiances $I_0$ and $I_1$. Fitting a curve through these samples produces a continuous representation of the camera response function. Exemplary embodiments of the disclosed method can be applied to grayscale or color images. For color images, the same mixtures can be used to sample and independently calibrate the three color channels.

Figure 2:
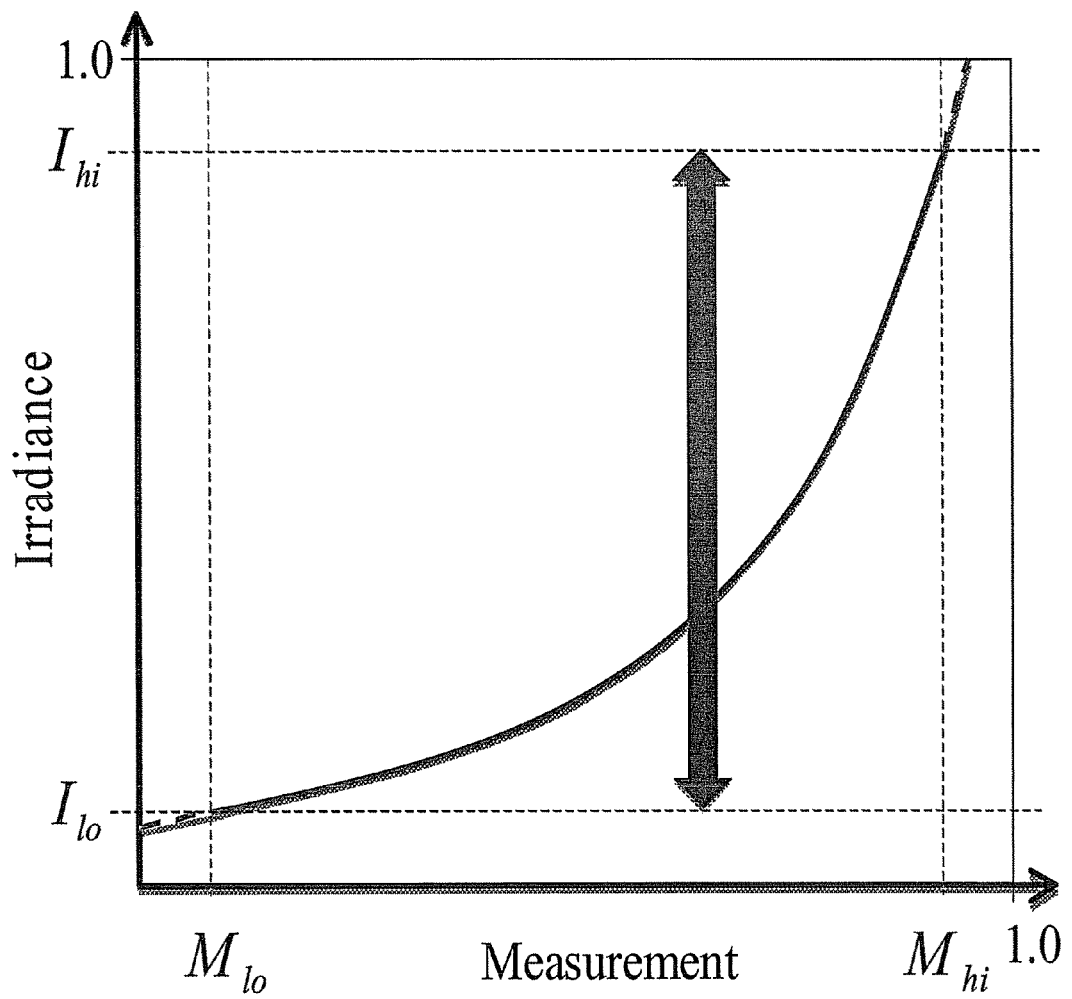
FIG. 2 is a graph of scale and offset ambiguities for radiometric calibration according to one embodiment of the disclosed method.

The irradiances in the temporal mixtures are unknown, so the measurements have two ambiguities. FIG. 2 is a graph of scale and offset ambiguities for radiometric calibration according to one embodiment of the disclosed method. An exemplary embodiment of the disclosed method blends a low irradiance $I_{lo}$ and a high irradiance $I_{hi}$, corresponding to measured intensities $M_{lo}$ and $M_{hi}$, respectively. Because $I_{lo}$ is unknown, there may be a global offset to the curve. This offset ambiguity is represented by the distance between the horizontal axis and the $I_{lo}$ line. The offset ambiguity is alleviated by making $I_{lo}$ as close to zero as possible. $I_{hi}$ is also unknown, leading to a scale ambiguity for the curve in the measured region, shown as the distance between the $I_{lo}$ line and the $I_{hi}$ line. Often, $I_{lo}$ is set below the noise floor and $I_{hi}$ is set above the saturation level, allowing for capture of the camera's entire response curve. Thus, even with both ambiguities, it is still possible to linearize the measured intensities.

Data from many different irradiance mixtures may be used to improve the estimate of the camera's response function. For example, using multiple mixtures that span a broader range of irradiances can increase the range of measurements. Across a motion-blurred edge, for example, many lines of pixel data may be used to improve robustness to noise.

Figure 3:
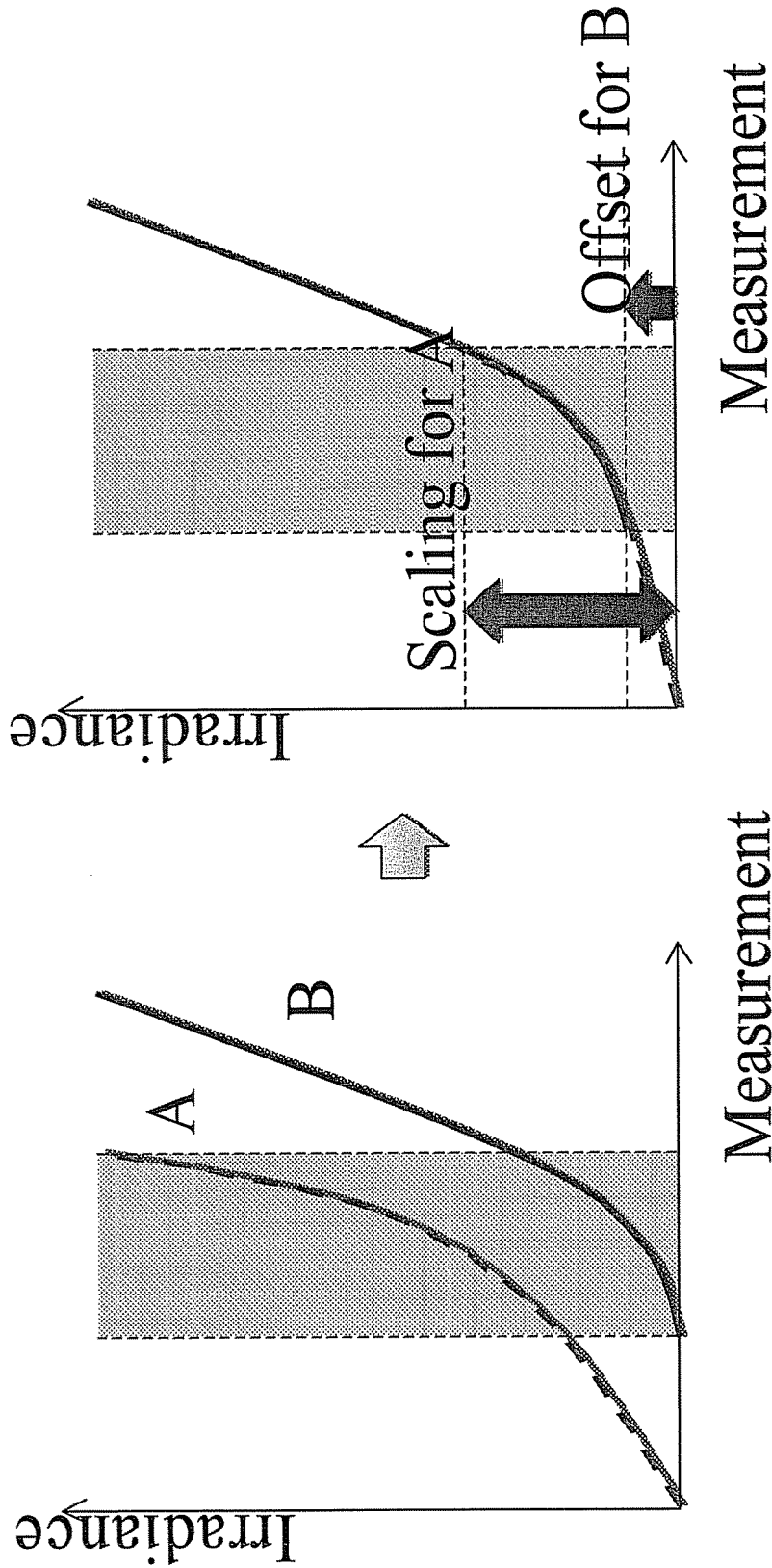
FIG. 3 is a graph of curve merging according to one embodiment of the disclosed method.

The relative low and high irradiances from each mixture are estimated to combine the data. FIG. 3 is a graph of curve merging according to the one embodiment of the disclosed method. On the left is an example with two measured irradiance blends. Each curve has an offset and scale ambiguity. To merge the data from both curves, the scale and offset that cause the two curves to coincide are computed. This is accomplished by simultaneously solving for a camera inverse response function g(M) and scale/offset values for each mixture that best align the data to g(M). The desired result is shown on the right side of FIG. 3.

Mathematically, the problem is as follows. n irradiance mixtures are observed. The number of observations in the j-th mixture, for $j \in (0, \ldots, n-1)$, is $1_j$. Each mixture is represented by a set of measurement-irradiance pairs, $(M_{ij}, I_{ij})$ for $i \in (0, \ldots, 1_j-1)$. $M_{ij}$ is the pixel value for observation i in mixture j. $I_{ij}$ is the relative irradiance for that measurement, up to the scale and offset ambiguity. Thus, it could correspond to $\propto$ from equation (4). Or, for evenly distributed samples between two irradiances (a linear ramp), the $I_{ij}$ could simply be 0,1, 2, ..., $(1_j-1)$, i.e., $I_{ij}=i$.

An exemplary embodiment of the disclosed method computes an inverse response function and a set of irradiance scales and offsets that aligns these measurements. The offsets are denoted by $r_j$ and the scales by $s_j$. There is an assumption that the inverse response function g(M) can be modeled by a polynomial of degree d with coefficients $a_k$, i.e., $g(M) = \Sigma_{k=0}^{d} a_k M^k$. We solve for a, r and s that minimize the following error function:

$$E = \sum_{j=0}^{n-1} \sum_{i=0}^{l_j} \left( s_i I_{ij} + r_j - \sum_{k=0}^{d} \alpha_k M_{ij}^k \right)^2 \quad \text{Eq. 5}$$

A monotonicity constraint that forces the first derivative of the inverse response function to be non-negative is added. The scale and offset of the final curve is still ambiguous; the curve is normalized by setting $a_0$ to zero and adding a constraint that $\Sigma_k a_k = 1$.

If the radiance of a computer monitor were linearly related to the displayed pixel value, one could easily measure a camera's response curve by displaying different known radiances and recording the intensities measured by the camera for a fixed exposure time. Most displays, however, have a non-linear relationship between the display pixel value and emitted intensities. Using temporal color mixtures in a first exemplary embodiment of the disclosed method, an uncalibrated display can be used to generate a linear ramp of irradiances. The first exemplary embodiment takes advantage of the high frame rate of computer displays to show several different frames during a single camera exposure.

The first exemplary embodiment of the disclosed method uses a display 16 that can display different frames at some frame rate K (in Hz). An exemplary suitable frequency is about 60 Hz. The camera 12 exposure time can be set to extend over an integral multiple N of frame times. For example, a one-second exposure can be used, with each pattern in the grid sequence being displayed for four frames during the exposure. Two pixel intensity levels, $P_{lo}$ and $P_{hi}$, are set. In an exemplary embodiment, $P_{lo}$ is pixel intensity 0, chosen to represent complete darkness and $P_{hi}$ is chosen to represent a level of light that is just high enough to saturate the camera's image sensor. This allows for capture of the entire range of the camera's response function. The low and high values are relative. For example, for a given display monitor, the low value may not be completely dark because some light leaks through the screen at all times. Moreover, high values will vary among display monitors.

Pixel values $P_{lo}$ and $P_{hi}$ produce irradiances $I_{lo}$ and $I_{hi}$, respectively, at the camera. If N frames may be displayed in one camera exposure, then a sequence of exposures may be used to generate N+1 samples of the response function that are evenly spaced in irradiance. A sequence of frames is captured, with $P_{lo}$ displayed for the first i frames, and $P_{hi}$ displayed for the remaining N−i frames, for $i \in 0 \leq i \leq N$. This generates a sequence of N+1 intensity measurements for irradiances evenly spaced between $I_{lo}$ and $I_{hi}$. Thus, pixel value $P_{lo}$ is displayed for some fraction $\propto$ of the exposure, and pixel value $P_{hi}$ is displayed for the remainder of the exposure. As in equation (4), this allows for known linear combinations of the irradiances $I_{lo}$ and $I_{hi}$ corresponding to the two selected pixel values. Fitting a curve through the measured values produces a continuous representation of the camera response function.

Figure 4:
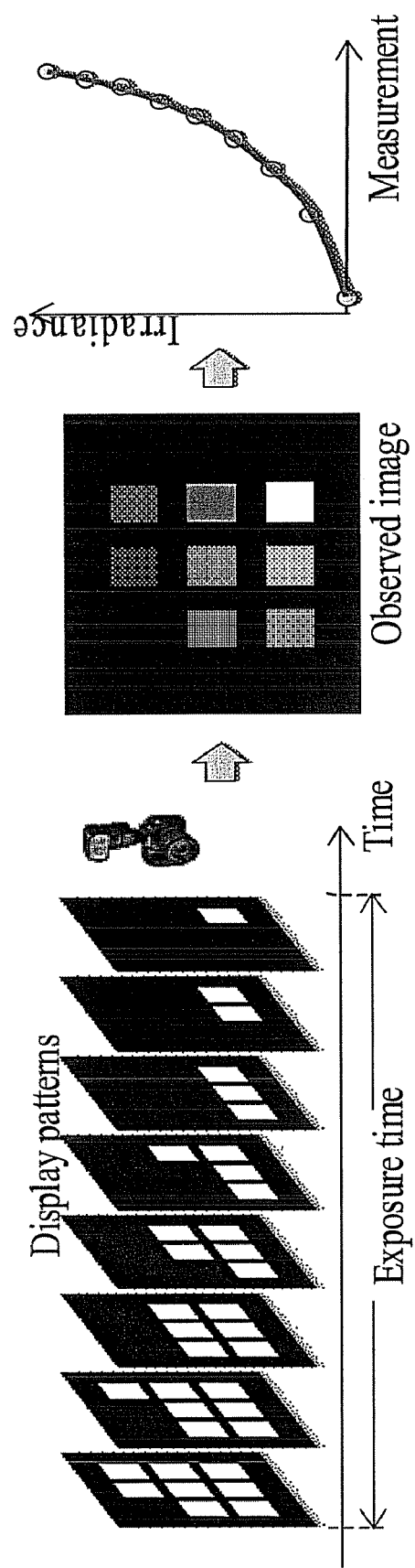
FIG. 4 shows radiometric calibration by temporally blending two intensities on a computer monitor.

An exemplary embodiment of the disclosed method requires only one image for each irradiance measurement. An exemplary approach for accelerating the data capture involves dividing the displayed image into a grid of patches and using each patch to display a different linear combination of radiances. FIG. 4 shows radiometric calibration by temporally blending two intensities on a computer monitor 16. In this example, a sequence of eight frames is displayed during a single camera exposure. For each patch, the bright and dark values are shown for different portions of the exposure. This creates a grid of patches in the camera image that have linearly spaced irradiances.

A camera shot can be broken down into a plurality of frames during a single exposure duration. In FIG. 4, looking at the exemplary series of eight frames displayed during the duration of a single camera exposure, it is apparent that the upper-left patch "sees" black for the entire exposure and the lower-right patch sees white for the entire exposure. The other patches see black for some portion of the exposure and white for some portion of the exposure. For example, the upper-middle patch sees white in one of the eight frames (or ⅛ of the time). The upper-right patch sees white in two of the eight frames (or ⅔ of the time). The middle row-left patch sees white in three of the eight frames (or ⅜ of the time). Thus, irradiance measures are obtained for each patch. For each of these patches, the camera's gauged light reading (measurement) is also obtained.

In an exemplary embodiment, the plotted irradiance is the fraction of the time during the exposure that the patch sees white. Plotting the irradiances versus their measured values in the image produces a sampled version of the inverse response curve.

For cameras with very nonlinear responses, one irradiance blend might poorly sample some part of the response curve. In those cases, the method may be extended by simultaneously displaying multiple grids to produce multiple blends. The data from the blends is then combined. Thus, more measurements may be added to poorly sampled regions. Fitting a curve through the measured values produces a continuous representation of the camera response function. This curve thus maps the amount of light received by the camera to the pixel intensity value measured by the camera.

An exemplary embodiment of display-based calibration of the disclosed method may be implemented using a liquid-crystal display (LCD) computer monitor such as a DELL 1907FPt monitor. The camera 12 and display monitor 16 do not need to be synchronized if the camera exposure duration can be set to a multiple of the display time for the entire frame sequence. In that case, a continuously repeating sequence of frames for the grid pattern can be used, as shown in FIG. 4.

LCD monitors might have other characteristics that could interfere with measurements, including, for example: unequal on and off transition times for the LCD material, backlight flicker, or inversion (switching the polarity of the applied LCD voltage at each pixel in every frame to prevent damage to the LCD material). To minimize these effects, a relatively long exposure time of one second is used, each image in the sequence is displayed for an even number of frames (such as four), and each pixel only switches its display value once during the sequence.

The brightness of each patch was observed to be heavily influenced by bright surrounding regions. Separating the patches by a black border eliminates this effect. An exemplary embodiment uses 30×30 pixel patches with 30 pixel black borders between all patches. To prevent artifacts due to non-uniform illumination of the display or vignetting in the camera, the overall size of the displayed pattern is small relative to the display and camera image dimensions. The display-based embodiment generally uses a display 16 with a known frame rate and a camera 12 with accurate control of the exposure duration.

Figure 5:
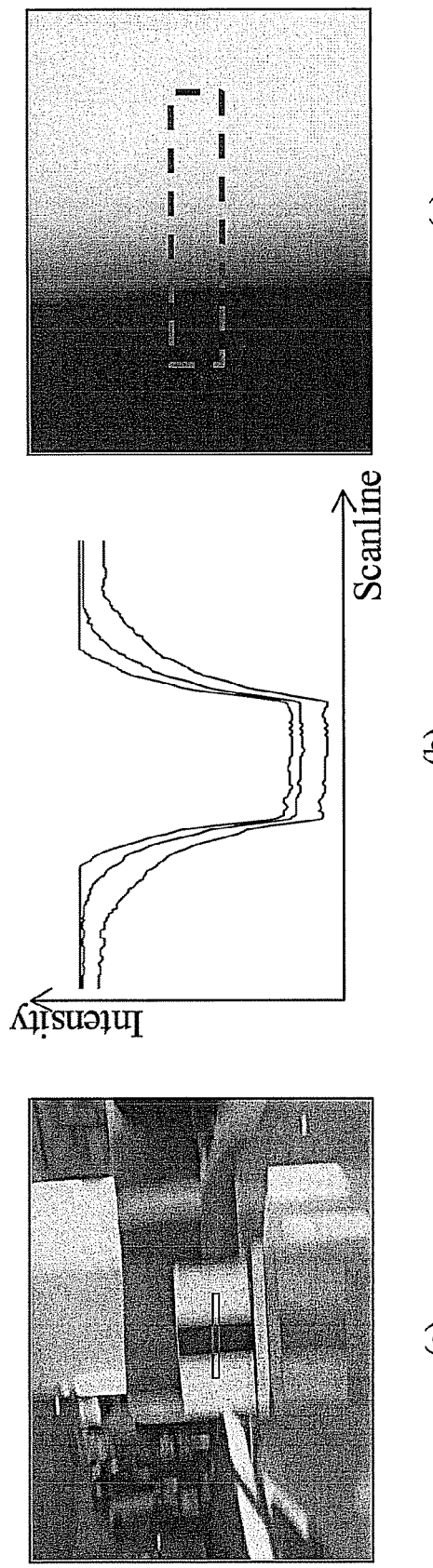
FIG. 5 illustrates calibrating from motion blur.

In situations in which such equipment is not available, calibration from motion blur may be used in a second embodiment. FIG. 5 illustrates calibrating from motion blur. FIG. 5(*a*) is a photograph of an example of motion blur with constant velocity across black and white regions. The box represents the start and end of the camera motion during an exposure(when the shutter opens and closes). Some pixels see white during the entire exposure time. Other pixels see black during the entire exposure time. Pixels on the edge between the regions see black for some fraction of the time and white for some fraction of the time. FIG. 5(*b*) is a graph showing the pixel intensity for one row of pixels crossing the blurred target. This is a sampled version of the camera response curve. FIG. 5(*c*) is a photograph of an example of a user interface for specifying the motion blurred region.

A target with an edge between two regions is created. While black and white are used in an example, the target may also be a high contrast edge between differently colored regions. The target is placed in front of the camera. A picture of the target is taken while moving the camera so the direction of blur is across the edge. In an alternative embodiment, the target may be moved rather than the camera. Pixels in the blurred region along the edge measure a blend of the two irradiances. If the target is uniformly illuminated and the motion is constant and substantially parallel to the plane of the target, the irradiance at the camera increases or decreases linearly from pixel to pixel across the edge. This produces a series of irradiances at the sensor that is linearly spaced between the irradiances for the two regions.

By choosing one region to be black and the other to be bright enough to saturate the camera, the entire range of the camera response can be captured. Moving the camera quickly enough (or exposing for long enough) to blur over many pixels produces many samples of the response function. The blurred values from many lines between the two regions can be combined to estimate the camera response function.

In an exemplary embodiment, the relative motion between the camera and the target is constant, roughly parallel to the plane of the target, and with some component across the edge. The target is also uniformly illuminated. Because the linear irradiance blend is distributed across many pixels in the image, the user insures that radiometric falloff is negligible over the motion blurred region in an exemplary embodiment. This can be accomplished, for example, by using a middle portion of the image, since falloff occurs at the edges. The direction of camera motion need not be exactly perpendicular to the edge between the two colored regions, as long as the edge is straight and the regions are large enough that the blurred region sees only the two intended irradiances. The camera is carefully focused to prevent adding additional blur to the irradiance profile.

In one embodiment, the motion-blurred region is manually specified using a simple user interface, as shown in FIG. 5(*c*). The monotonically decreasing or increasing ramps of gray-scale values in each scanline are located and data are combined from the specified rows to produce the response function. If a symmetric target is used, the accuracy of the calibration can be verified: if the motion is not linear or the illumination varies too greatly, the response curves calculated from the left and right edges of the black region will not match. On the other hand, if these conditions are satisfied, the two curves will agree. Such agreement can be evaluated through visual inspection or use of a quantitative method.

Thus, two exemplary calibration methods using temporal color mixtures to compute camera radiometric response functions include a first display-based embodiment and a second motion-blur embodiment. The display-based embodiment is well-suited for laboratory environments. For outdoor settings or with cameras whose exposure time cannot be set, the motion blur embodiment is particularly suitable. An exemplary strength of these methods lies in their ability to directly sample the response function. Plotting the measured data provides immediate feedback about the shape of the response curve and the accuracy of the computed fit. This is not true for methods based on analyzing edges or noise distributions. Moreover, exemplary embodiments of the disclosed method do not rely on statistical priors over the camera response function. This allows for calibration of cameras not represented well by existing priors.

Figure 6:
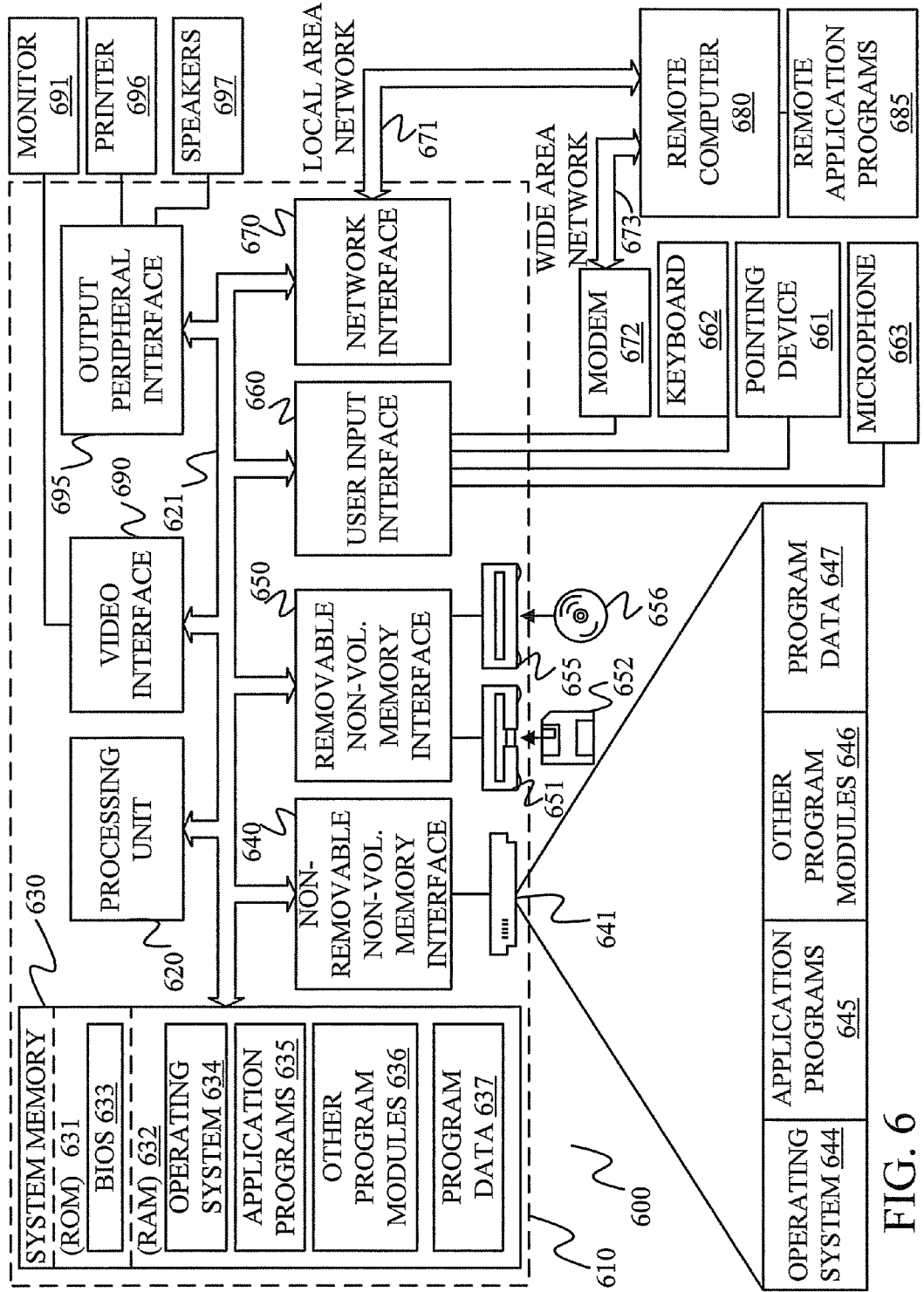
FIG. 6 illustrates an example of a suitable computing system environment in which embodiments of the disclosed method may be implemented.

FIG. 6 illustrates an example of a suitable computing system environment 600 in which exemplary disclosed embodiments of the disclosed method may be implemented. The computing system environment 600 is only one example of a suitable computing environment and is not intended to suggest any limitation as to the scope of use or functionality of the claimed subject matter. Neither should the computing environment 600 be interpreted as having any dependency or requirement relating to any one or combination of components illustrated in the exemplary operating environment 600.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments have been described herein are useable in the general context of computer-executable instructions, such as program modules, being executed by a computer. Generally, program modules include routines, programs, objects, components, data structures, etc. that perform particular tasks or implement particular abstract data types. Embodiments can be practiced in distributed computing environments where tasks are performed by remote processing devices that are linked through a communications network. In a distributed computing environment, program modules can be located on both (or either) local and remote computer storage media including memory storage devices.

With reference to FIG. 6, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610.

Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637. This is but one example of a possible implementation.

The computer 610 may also include other removable/non-removable volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. This is but one example of a possible implementation.

A user may enter commands and information into the computer 610 through input devices such as a keyboard 662 and a pointing device 661, such as a mouse, trackball or touch pad. Other input devices (not shown) may include a joystick, game pad, microphone, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The logical connection depicted in FIG. 6 is a wide area network (WAN) 673, but may also or instead include other networks. Computer 610 includes a modem 672 or other means for establishing communications over the WAN 673, such as the Internet. The modem 672, which may be internal or external, may be connected to the system bus 621 via the user-input interface 660, or other appropriate mechanism. Remote computer 680 is shown as operating remote applications 685.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while some descriptions refer to black and white, the disclosed methods may also be applied for the calibration of color cameras by applying to methods to each color channel separately. Moreover, the disclosed methods may be fully integrated into cameras of interest for internal calibration. Also, the disclosed methods may be applied to cameras that are stand-alone units as well as cameras that are integrated into other devices, such as cellular phones.

What is claimed is:

1. A method of calibrating a brightness value measured by a camera with an amount of light received by the camera, the method comprising:
   creating a series of measurements, wherein for each measurement the amount of light received at an image plane in the camera is controlled to be a known ratio of two opposed irradiance values: a high irradiance value and a low irradiance value,
   taking a series of exposures with the camera, each exposure being divided in time into a plurality of frames, each frame representing a fraction of exposure time, wherein the amount of light received at a region of an image plane in the camera is constrained to one of the two opposed irradiance values: the high irradiance value and the low irradiance value,
   for each exposure, determining a ratio of the number of frames in which the region exhibits the high irradiance value to the number of frames in which the region exhibits the low irradiance value,
   the ratio being set in different exposures to sample a range between the two opposed irradiance values;
   correlating each ratio with the brightness value measured by the camera; and
   obtaining a function describing the correlation.

2. The method of claim 1 wherein a computer display divides each exposure in time into the plurality of frames.

3. The method of claim 1 wherein a rapidly blinking light divides each exposure in time into the plurality of frames.

4. The method of claim 1 wherein the function is a polynomial function.

5. The method of claim 1 wherein the low irradiance value is below a noise level of the camera.

6. The method of claim 1 wherein the high irradiance value is above a saturation level of the camera.

7. A calibration system comprising:
   a camera that measures a brightness value and receives an amount of light in a single exposure shot of a target, the single exposure comprising a plurality of patches;
   a computer display monitor that temporally breaks down the single exposure into a plurality of frames, each frame representing a fraction of exposure time, wherein each patch of each of the plurality of frames is constrained to one of two opposed irradiance values, a high irradiance value and a low irradiance value; and
   a computer processor that sets a ratio of the number of frames in which the patch exhibits the high irradiance value to the number of frames in which the patch exhibits the low irradiance value, correlates the ratio for each patch with the brightness value measured by the camera for the patch, and obtains a function describing the correlation.

8. A hardware computer readable medium having instructions stored thereon which, when executed, cause a computer to perform a method of calibrating a brightness value measured by a camera with an amount of light received by the camera in a single exposure shot of a target, the method comprising:
   receiving a single exposure with the camera, the single exposure comprising a plurality of patches;
   temporally breaking down the single exposure into a plurality of frames, each frame representing a fraction of exposure time, wherein each patch of each of the plurality of frames is constrained to one of two opposed irradiance values, a high irradiance value and a low irradiance value;
   for each patch, determining a ratio of the number of frames in which the patch exhibits the high irradiance value to the number of frames in which the patch exhibits the low irradiance value;
   correlating the ratio for each patch with the brightness value measured by the camera for the patch; and
   obtaining a function describing the correlation.

9. The hardware computer readable medium of claim 8 wherein the function is a polynomial function.

10. The hardware computer readable medium of claim 8 wherein the low irradiance value is below a noise level of the camera.

11. The hardware computer readable medium of claim 8 wherein the high irradiance value is above a saturation level of the camera.

* * * * *